US006203774B1

(12) United States Patent
Han et al.

(10) Patent No.: US 6,203,774 B1
(45) Date of Patent: Mar. 20, 2001

(54) METHOD FOR PRODUCING IRON OXIDE POWDER USING A PARTICLE SIZE AND SHAPE CONTROLLER

(75) Inventors: Kyong-Sop Han; Dong-Sik Bae, both of Seoul; Jun Seok Noh, Goangju; Sang Heul Choi, Seoul; Seung Beom Cho, Goangmyung, all of (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 09/339,681

(22) Filed: Jun. 24, 1999

(30) Foreign Application Priority Data

Oct. 16, 1998 (KR) .................................................. 98-43371

(51) Int. Cl.[7] .................................................. C01G 49/02
(52) U.S. Cl. ............................................................. 423/632
(58) Field of Search .................................. 423/632, 633, 423/634

(56) References Cited

U.S. PATENT DOCUMENTS 4,448,761 * 5/1984 Sarnecki et al. ...................... 423/632

OTHER PUBLICATIONS

Noh, et al., "The synthesis of Fe3O4 powder through a glycothermal process," Yoop Hakhoechi, 34(11), pp. 1159–1164, 1997.*

Seung Beom Cho, et al., J. Am. Ceram. Soc., vol. 79, No. 1, pp. 88–96, "Morphological Forms of –Alumina Particles Synthesized in 1,4–Butanediol Solution", 1996, no month.

E. Matijevic, et al., Colloid & Polymer Sci., vol. 265, No. 2, p. 155–163, "Formation of Uniform Colloidal Iron (III) Oxides in Ethylene Glycol–Water Solutions", 1987, no month.

Shuichi Hamada, et al, Journal of Colloid and Interface Science, vol. 84, No. 1, p. 274–277, "Ferric Hydrous Oxide Sols. IV. Preparation of Uniform Cubic Hematite Particles by Hydrolysis of Ferric Chloride in Alcohol–Water Solutions", Nov. 1981.

R. S. Sapieszko, et al., Corrosion, vol. 37, No. 3, p. 152–161, "Hydrothermal Formations of (Hydrous) Oxides on Metal Surfaces", Mar. 1981.

K. Abe, et al., Ceramic Powder Science IV, p. 15–25, "Hydrothermal Processing of Functional Ceramic Powders", no date.

R. S. Sapieszko, et al., Journal of colloid and Interface Science, vol. 74, No. 2, p. 405–422, "Preparation of Well–Defined Colloidal Particles by Thermal Decomposition of Metal Chelates", Apr. 1980.

Masatada Ozaki, Chemical Processing of Ceramics, p. 421–443, "Synthesis of Magnetic Particles", 1994, no month.

B. R. Pieters, et al., Colloid and Surface Engineering, Applications in the process industries, p. 248–286, "Magnetic Carrier Technology", 1992, no month.

H. Füredi–Milhofer, et al., Dispersionn of Powders in Liquids, Applied Science Publishers Ltd., p. 203–272. "Principles of Precipitation of Fine Particles", 1985, no month.

* cited by examiner

*Primary Examiner*—Steven Bos
(74) *Attorney, Agent, or Firm*—Oblon, Spivak, McClelland, Maier & Neustadt, P.C.

(57) ABSTRACT

A method for producing iron oxide powder, of which the particle size and shape are controlled, comprising the steps of dissolving α-FeOOH in a glycol as a solvent to provide a solution; adding a controller for particle size and shape of the powder to the solution to provide a mixture; and reacting the mixture at a temperature of 150 to 300 ° C. for 1 to 48 hours.

7 Claims, 9 Drawing Sheets

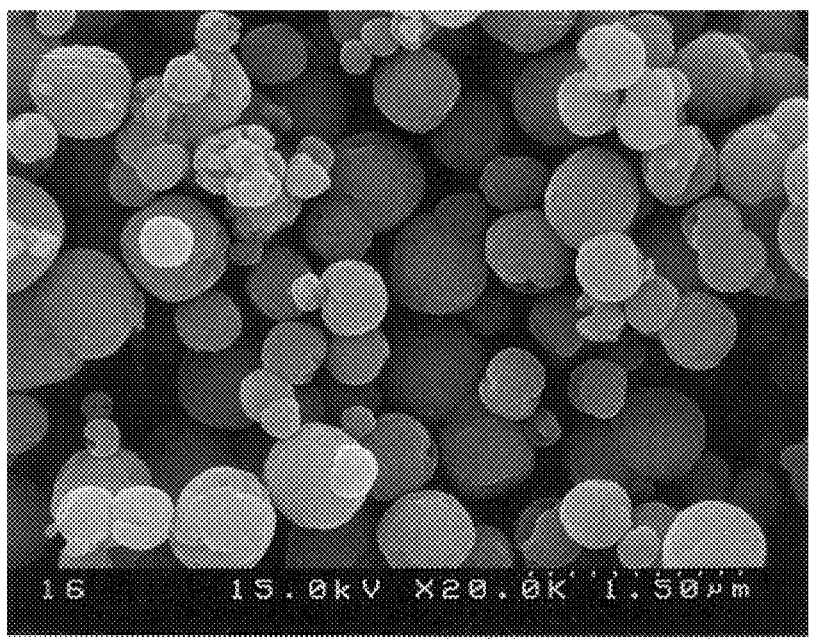
ITACONIC
ACID:$10^{-3}$mol/1
F I G. 9A
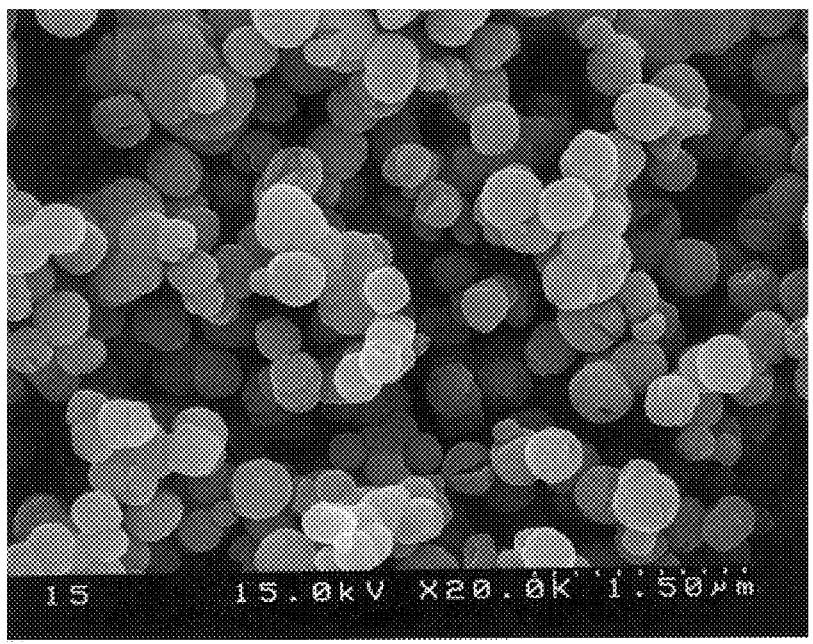
ITACONIC
ACID:$10^{-2}$mol/1
F I G. 9B ITACONIC ACID: $5 \times 10^{-2}$ mol/l

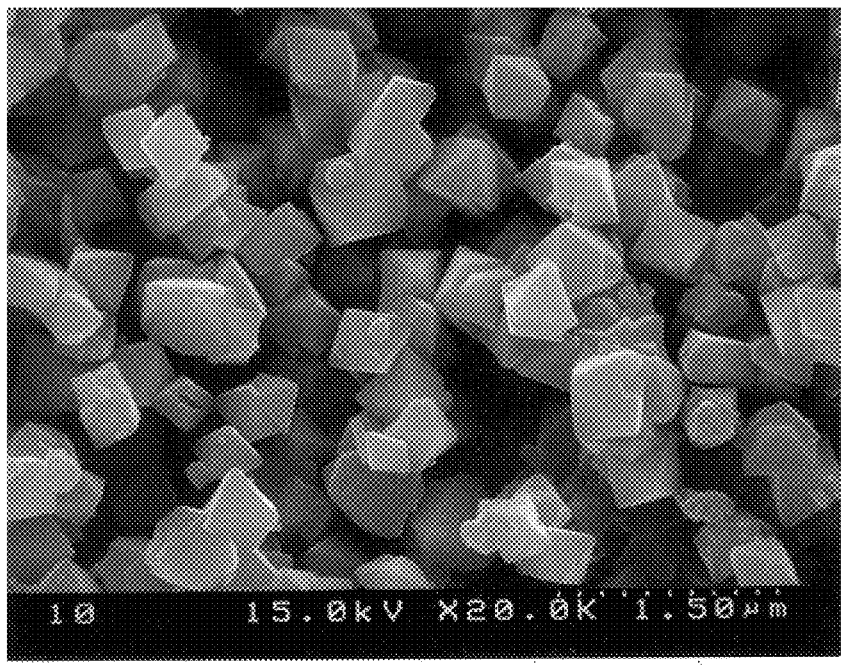
ITACONIC ACID: $10^{-2}$ mol/l
F I G. 10A
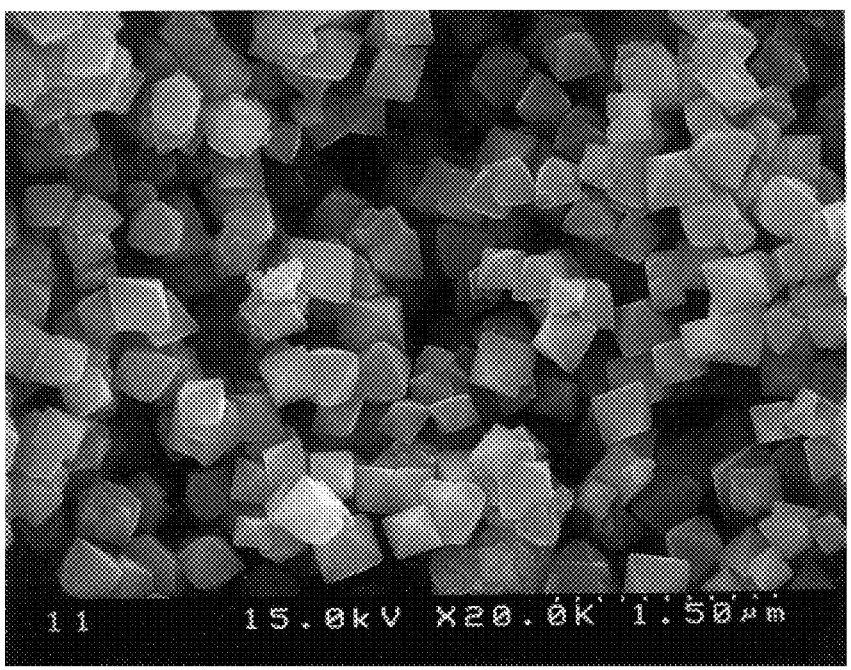
ITACONIC ACID: $5 \times 10^{-2}$ mol/l
F I G. 10B

MN-2

$10^{-2}$ M

MN-3

X-RAY DIFFRACTION ANALYSIS OF IRON OXIDE PARTICLES OBTAINED BY GLYCOTHERMAL SYNTHESIS METHODS:
(1) EXAMPLE 1; (2) EXAMPLE 2, (3) EXAMPLE 3; (4) $10^{-2}$M OF ITACONIC ACID IN EXAMPLE 4; (5) $5 \times 10^{-2}$M OF ITACONIC ACID IN EXAMPLE 5; AND (6) $10^{-1}$M$_3$ OF $HNO_3$ IN EXAMPLE 6

METHOD FOR PRODUCING IRON OXIDE POWDER USING A PARTICLE SIZE AND SHAPE CONTROLLER

BACKGROUND OF THE INVENTION

1. Field of the Invention

The present invention relates to a method for producing iron oxide powder, characterized in that the particle size and shape of iron oxide powder can be controlled by reacting α-FeOOH under an appropriate temperature and pressure using an organic solvent and the controller for particle size and shape. More particularly, the invention relates to a method of producing iron oxide powder in which the particle size and shape of crystals can be controlled by growing crystalline particles of iron oxide stably through a chelating reaction using glycol of a dihydric alcohol and reacting the grown crystalline particles at a relatively low temperature.

2. Description of the Prior Art

Recently, there has been increasing interest in the study of the synthesis of ceramics powder and its commercial application. The particle size and shape of ceramics powders are important factor in determining ceramics' physical properties. Thus, many researchers have been conducting studies to develop methods for controlling the particle size and shape of ceramics. Ceramics is a general term for inorganic materials. A compound consisting of Fe and O among ceramics is called as an iron oxide, and a crystal of $Fe_3O_4$ among the iron oxide is classed as ferrite.

Namely, ferrite is an inorganic compound which has iron oxide ($Fe_3O_4$) as a major component. Ferrite exhibits a ferromagnetic property and has been widely used in the electronics industry. Recently, interest in ferrite has also increased in the somatoscience industry because it can selectively separate and isolate certain components of an organism and thus has a potentiality for application in the development of drugs. It has been known that the magnetic property of iron oxide powder, a major component of ferrite, varies depending on the particle size and shape of iron oxide.

Ferrite particles being used at present are produced by an emulsion method that entails high production costs. Thus, there has been the search for a cheaper method of producing ferrite particles. Furthermore, there is a need to develop a method of producing ferrite powder that has large crystallinity, high affinity to organic compounds and excellent magnetic characteristics.

Generally, in methods using a solid state, it is almost impossible to prepare ceramic particulates having a particle size of not more than 1 μm and there are defects that a composition of ceramics powder produced may be different from that of raw materials. Furthermore, in the solid state method, it is not easy to control the shape of the powder. To solve this problem, preparation methods using a liquid state, for example, co-precipitation, hydrothermal synthesis, sol-gel method, etc., have been actively studied with positive results. Among these methods, hydrothermal synthesis, which uses an appropriate temperature and pressure, is regarded as being able to control the composition, particle size and shape of the powder relatively easily. A lot of studies have already been made and some of them have been applied to commercial use.

At present, the studies on hydrothermal synthesis have focussed on using an organic metal compound, as a starting material, instead of a salt or a hydroxide, or on using an organic solvent rather than an aqueous solvent. For example, according to the research of R. S. Sapiesko & E. Matijevi, C., α-$Fe_2O_3$ and $Fe_3O_4$ could be obtained by reacting a ferric salt with a chelating agent such as TEA or EDTA under a basic atmosphere and then decomposing the resulting Fe chelate by adding an oxidizing agent and a reducing agent under an hydrothermal synthetic condition of 250° C.

In addition, some studies have reported a novel method of producing ferrite powder, which can produce uniform powder at a lower temperature and pressure than that of hydrothermal synthesis through forming a complex of a metal ion with an organic solvent or its derivatives that primarily uses an organic solvent without using separate chelating agent or a metal chelate. This method is widely known as the Pechini method. According to this method, a complex of a metal ion and an organic solvent and its derivatives are formed and then the complex polymer is burned under an elevated pressure to prepare powder. It is reported that fine powder can be obtained by the method but it is not easy to control size and shape of the obtained powder.

When considering cases using an organic solvent, several ceramics powders, such as alumina, were typically produced by using mainly an alcohol or a mixed solution with its aqueous solution. Furthermore, the production of a glycol derivative and its complex through the reaction of an Al ion and a glycol was also identified. Another reported method is said to be able to prepare monodispersion α-$Al_2O_3$ particles at a temperature of 300° C. by using 1,4-butylene glycol as a solvent and which can stably control diverse shapes of the particles. When an aqueous solvent is used, the monodispersion α-$Al_2O_3$ particles can only be prepared under a temperature of more than 500° C. However, few cases have been found where ferrite powder was produced by using an organic solvent. Also, the reported method uses salts of nitric and sulfuric acid as starting materials. Unlike this method, the present invention uses a hydroxide crystal as a starting material, and as a result, it can easily control the particle size and shape of the powder.

Based on the above research results, the present invention uses a dihydric alcohol, i.e., glycol, instead of an aqueous solution to stably grow crystalline particles of iron oxide through a chelating reaction and to lower the crystallization temperature so as to control the particle size and shape of the crystals. Many studies on hydrothermal synthesis for producing iron oxides have been reported. However, a study that uses glycol as a solvent to produce iron oxides has not been reported yet.

Thus, the invention aims to control the particle size and shape of iron oxides by a glycothermal reaction which uses glycol as a solvent. The inventors of the present invention have studied the effects of propylene glycol and ethylene glycol as a solvent and several additive upon the particle size and shape of the powder and established appropriate conditions based on these studies.

3. Description of the Invention

SUMMARY OF THE INVENTION

It is an object of the present invention to provide a method for producing iron oxide powder, characterized in that the size and shape of the particles of iron oxide powder can be controlled by reacting α-FeOOH under an appropriate temperature and pressure using an organic solvent and controller for particle size and shape.

DETAILED DESCRIPTION OF THE INVENTION

Figure 1:
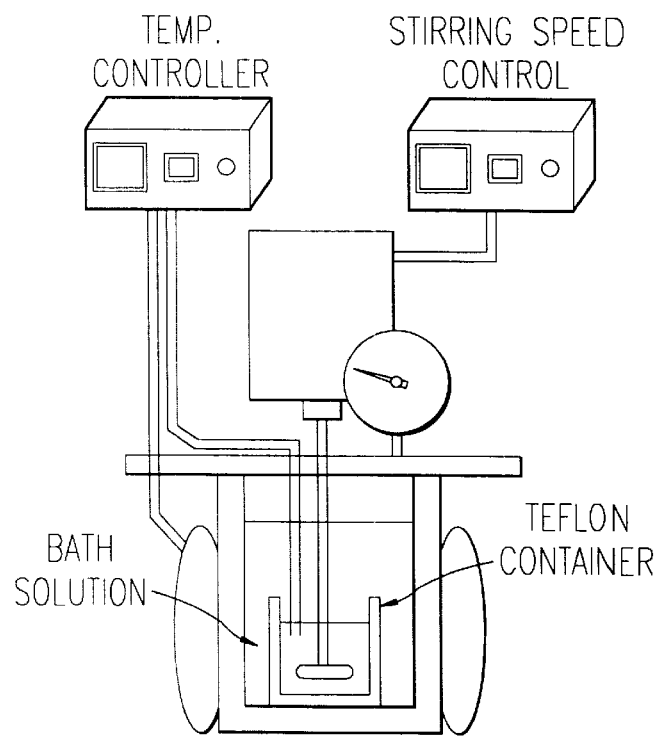
FIG. 1 is a schematic view representing an apparatus for producing iron oxide powder according to the present invention.
Figure 2:
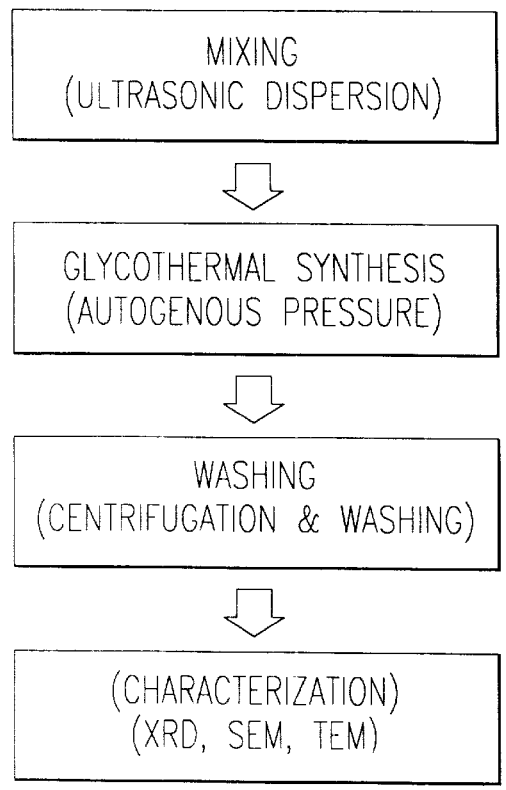
FIG. 2 is a flow chart representing processes for producing iron oxide powder.
Figure 3:
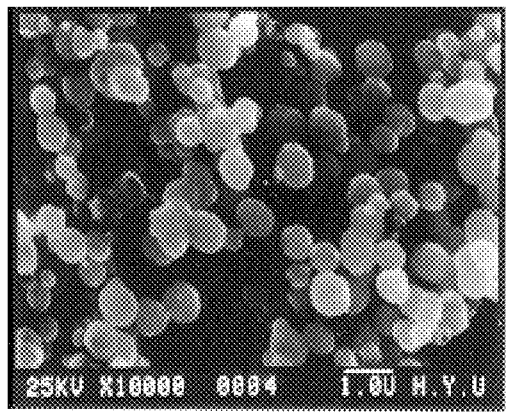
FIG. 3 is an enlarged view representing the detailed structure of the iron oxide particles in a circular form produced according to the present invention, which was observed by an electronic microscope.
Figure 4:
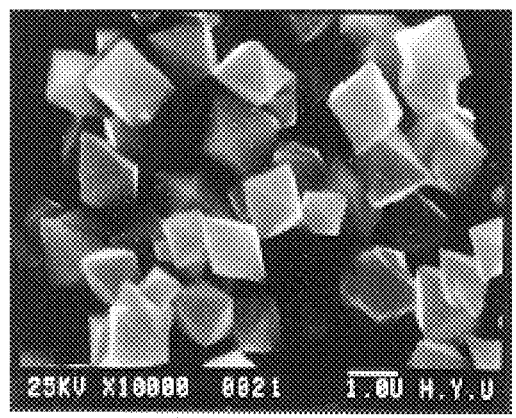
FIG. 4 is an enlarged view representing the detailed structure of iron oxide particles in a octahedron form produced according to the present invention, which was observed by an electronic microscope.

The method for producing iron oxide powder according to the present invention has similar procedures to those of hydrothermal synthesis and uses an organic solvent as a major solvent. Conventional hydrothermal synthesis methods use amorphous hydroxides obtained by a precipitation method as a starting material. Unlike the conventional hydrothermal method, the present invention uses $\alpha$-FeOOH of crystalline hydroxide as a starting material to induce dissolution and re-deposition reaction in propylene or ethylene glycol solvents so as to control the particle size and shape.

Because the glycol to be used in the present invention is a slightly viscous solvent under room temperature, $\alpha$-FeOOH in dry powder form cannot be well dispersed in a glycol solution by a process such as mechanical stirring. Thus, glycol, distilled water as a controller for particle size and shape, and other additives, excluding $\alpha$-FeOOH powder as a precursor, are mixed according to each experimental composition using a magnetic stirrer and thereafter dry powder of $\alpha$-FeOOH is added to the mixture. The resulting mixture is mixed for about five minutes using a ultrasonic dispersor in order to mix and disperse uniformly and then to induce a reaction in the reactor. The powders produced by the reaction are divided into several 10 ml test tubes for centrifugal separation. Thereafter, it is centrifuged at 2,000–9,000 rpm and then the phase and shape of crystals thus obtained are examined.

In order to obtain the particle size and shape of iron oxide powder desired in the present invention, it is preferred to conduct the present method at temperatures of 150 to 300° C., at pressures of 3 to 30 kgf/cm$^2$, at a reaction time of 1 to 48 hours and at the concentration of $\alpha$-FeOOH of 0.1 to 0.5 mol/l.

Also, the glycol solvent used in the present invention can be selected from the group consisting of ethylene glycol and propylene glycol, or a mixture thereof can be used. A controller for particle size and shape is selected at least one from the group consisting of $H_2O$, itaconic acid and $HNO_3$.

In cases where glycol, for example, propylene glycol and ethylene glycol, is used as a major solvent, supersaturation degree of $\alpha$-FeOOH can increase to generate production and growing of nuclei which results in producing powder. A glycol having a higher number of carbons is more sensitive to an increased amount of water and requires a higher reaction temperature.

The particle size of $\alpha$-FeOOH, used as a starting material, hardly affects the particle size and shape of iron oxides produced because it is completely dissolved in the solvent.

The more water is used as a controller for the particle size and shape added to a solvent, the lessr the degree of supersaturation of $\alpha$-FeOOH. Accordingly, the amount of nuclei generation and the particle growing velocity is reduced and thus the particles grow into (111) face, which is stable energetically, consequently to largely grow to octagonal shape. If an excessive amount of water is added, the supersaturation degree reduces. Consequently, the reaction does not reach completion, and $\alpha$-FeOOH remains as it is. Thus, appropriate amount of water to be added as a controller for particle size and shape is within a range of 8 to 335 ml/glycol(liter).

If itaconic acid is used as a controller of particle size and shape, the addition of itaconic acid increases the velocity of nuclei generation, which results in a reduction of the average size of particles produced. For example, in cases where 1 g of $\alpha$-FeOOH is reacted with the mixture of 60 ml of major solvent ethylene glycol with 10 ml of water, octagon-shaped powder is obtained. However, if about $10^{-2}$ M of itaconic acid is added to the above reaction mixture, the velocity of nuclei generation increases to consequently reduce average particle size. If the concentration of itaconic acid increases to $10^{-1}$ M, the velocity of nuclei generation increases to consequently reduce the particle size and change the shapes of the particles into circular forms. The appropriate concentration of itaconic acid is within a range of $10^{-3}$ to $5 \times 10^{-1}$ M. If the concentration of itaconic acid is too low, the velocity of the generation of nuclei hardly increases. If the concentration of itaconic acid is too high, the velocity of the generation of nuclei increases to the point in which very small particles are rapidly generated. Therefore, it is not easy to control for particle size and shape.

$HNO_3$ as a controller for particle size and shape has the function of facilitating the generation of nuclei by promoting the dissolution of $\alpha$-FeOOH by increasing its solubility and thus relatively increasing the degree of its supersaturation. In cases where a concentration of $10^{-1}$ M of $HNO_3$ is added, the powder shape remains unchanged and the particle size of the powder reduced. In cases where $5 \times 10^{-1}$ M of $HNO_3$ solution is added, very fine particles which do not have certain shapes are obtained. The appropriate concentration of $HNO_3$ as a controller for particle size and shape is the range of $10^{-2}$ to $5 \times 10^{-1}$ M.

Electronic microscope and X-ray diffraction analysis show that the particle size of iron oxide powder produced according to the method of the present invention is in the range of 0.05 to 5 µm. The particles are circular in form, or are shaped as a octahedron, tetradecahedron or a polygon inbetween therein. The experimental results are presented in FIGS. 1 to 12. Furthermore, because the color of α-FeOOH powders is yellow, that of $Fe_2O_3$ powder is red and that of $Fe_3O_{43}$ powder is black, it can be also confirmed visually that a phase transfer from α-FeOOH into $Fe_3O_4$ occurs.

DESCRIPTION OF THE PREFERRED EMBODIMENTS

The present invention will be illustrated in greater detail by way of the following examples. The examples are presented for illustrative purposes only and should not be construed as limiting the invention.

Example 1

Figure 6:
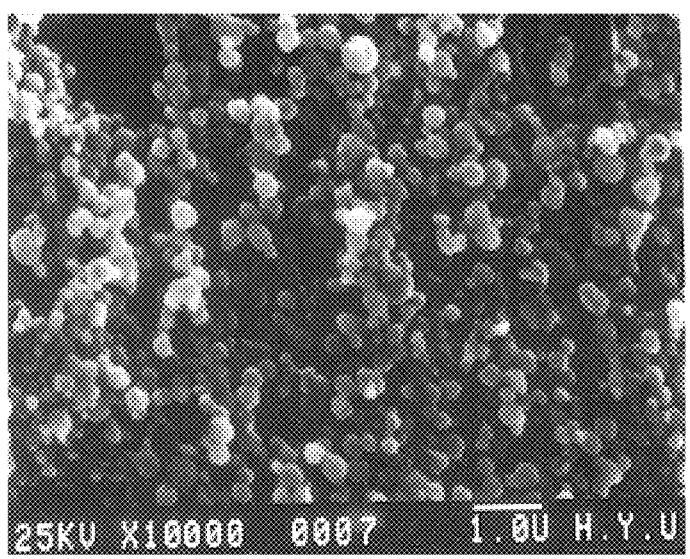
FIG. 6 is a configuration drawing representing the iron oxide particles produced according to example 1 of the present invention, which was observed by an electronic microscope.

1 g of α-FeOOH was dissolved in 60 ml of propylene glycol, then 3 ml of water was added to the mixture and thereafter the mixture was reacted in the reactor at a temperature of 240° C. for three hours. The powder particles thus obtained were circular and the particle size of the powder was 0.2 to 0.3 µm as shown in FIG. 6. X-ray diffraction analysis on the crystallinity of the powder obtained showed that α-FeOOH was phase transferred into $Fe_3O_4$ (See FIG. 12).

Example 2

Figure 7:
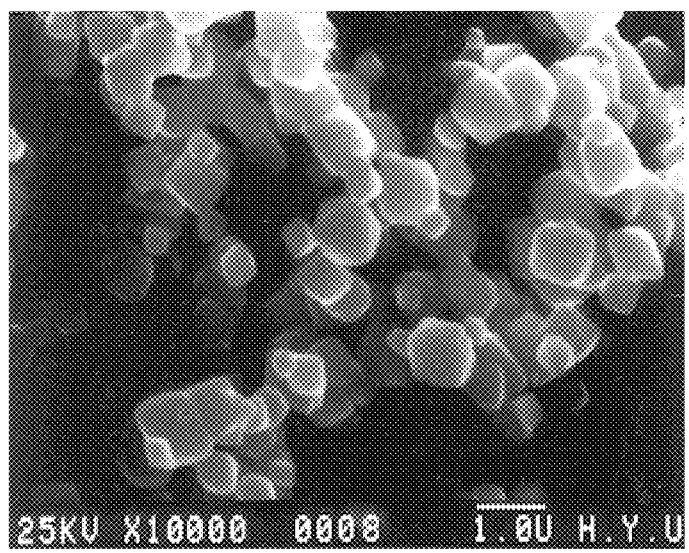
FIG. 7 is a configuration drawing representing the iron oxide particles produced according to example 2 of the present invention, which was observed by an electronic microscope.

1 g of α-FeOOH was dissolved in 60 ml of propylene glycol, then 5 ml of water was added to the mixture and thereafter the mixture was reacted in the reactor at a temperature of 240° C. for three hours. The powder particles thus obtained were octahedron and the particle size of the powder was less than or 1 µm as shown in FIG. 7. X-ray diffraction analysis on the crystallinity of the powder obtained showed that α-FeOOH was phase transferred into $Fe_3O_4$ (See FIG. 12).

Example 3

Figure 8:
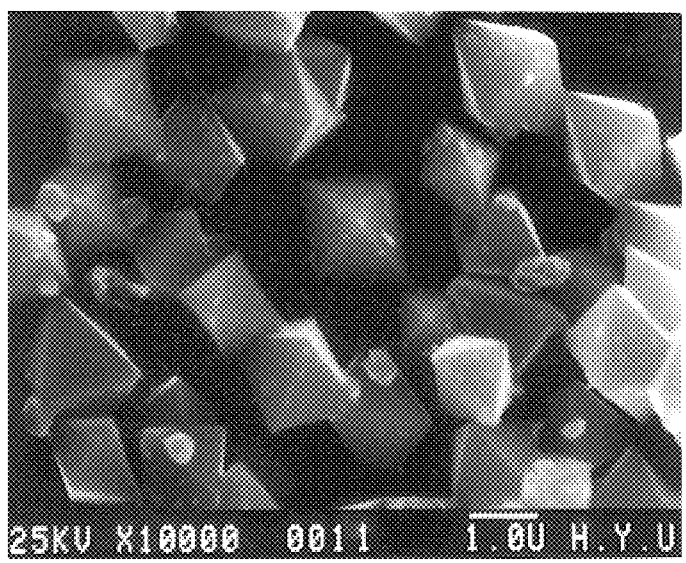
FIG. 8 is a configuration drawing representing the iron oxide particles produced according to example 3 of the present invention, which was observed by an electronic microscope.

1 g of α-FeOOH was dissolved in 60 ml of propylene glycol, then 10 ml of water was added to the mixture and thereafter the mixture was reacted in the reactor at a temperature of 240° C. for three hours. The powder thus obtained was octahedron and the particle size of the powder was 1.8 to 2.0 µm as shown in FIG. 8. X-ray diffraction analysis on the crystallinity of the powder obtained showed that α-FeOOH was phase transferred into $Fe_3O_4$ (See FIG. 12).

Example 4

Figure 9C:
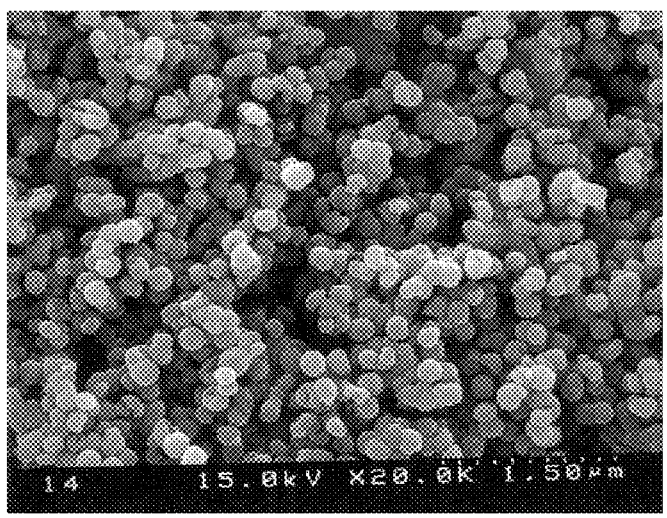
FIG. 9 is a configuration drawing representing the iron oxide particles produced according to example 4 of the present invention, which was observed by an electronic microscope.
Figure 10C:
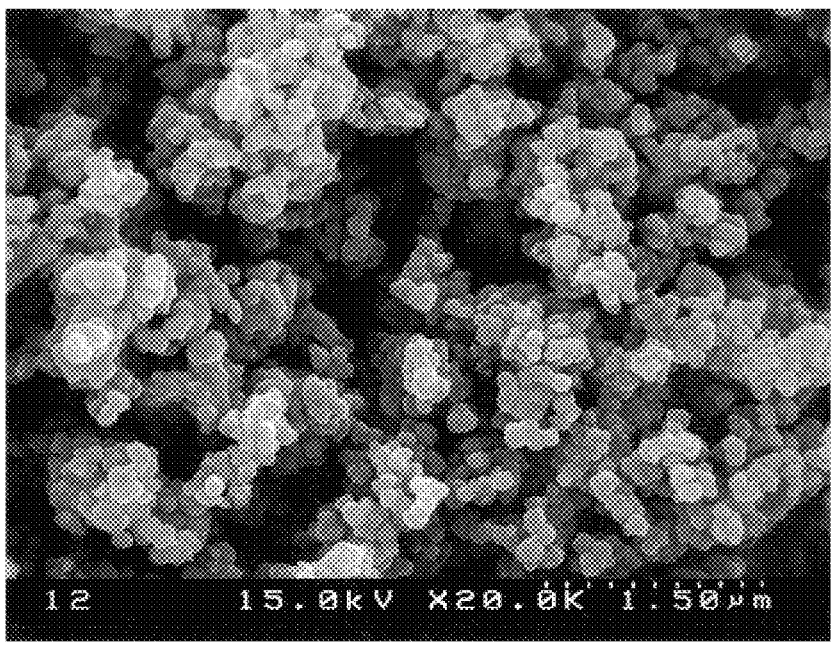
FIG. 10 is a configuration drawing representing the iron oxide particles produced according to example 5 of the present invention, which was observed by an electronic microscope.

1 g of α-FeOOH was dissolved in 60 ml of ethylene glycol, then 5 ml of water and each of $10^{-3}$, $10^{-2}$ and $5 \times 10^{-2}$ mol/l of itaconic acid were added to the mixture and thereafter the mixture was reacted in the reactor at a temperature of 230° C. for three hours. The powder particles thus obtained were circular form and the particle sizes of the powder was in a range of 0.15 to 0.6 µm as shown in FIG. 9. When the concentration of itaconic acid was increased, the particle size reduced. X-ray diffraction analysis on the crystallinity of the powder obtained showed that αFeOOH was phase transferred into $Fe_3O_4$ (See FIG. 12).

Example 5

1 g of α-FeOOH was dissolved in 60 ml of ethylene glycol, then 10 ml of water and each of $10^{-2}$, $5 \times 10^{-2}$ and $10^{-1}$ mol/l of itaconic acid were added to the mixture and thereafter the mixture was reacted in the reactor at a temperature of 230° C. for three hours to produce the powder. The obtained forms of the powder observed by an electronic microscope, is presented in FIG. 10. The particle size of the powder obtained was between 0.1 and 0.6 µm. The octahedron form particles were produced when the concentration of itaconic acid was added in the range of $10^{-2}$ to $5 \times 10^{-2}$ mol/l, and the particle size decreased as the concentration of itaconic acid increased. When the concentration of itaconic acid added was $10^{-1}$ mol/l, very small circular particles rather than octahedron form particles were obtained. X-ray diffraction analysis on the crystallinity of the powder obtained showed that α-FeOOH was phase transferred into $Fe_3O_4$ (See FIG. 12).

Example 6

Figure 11A:
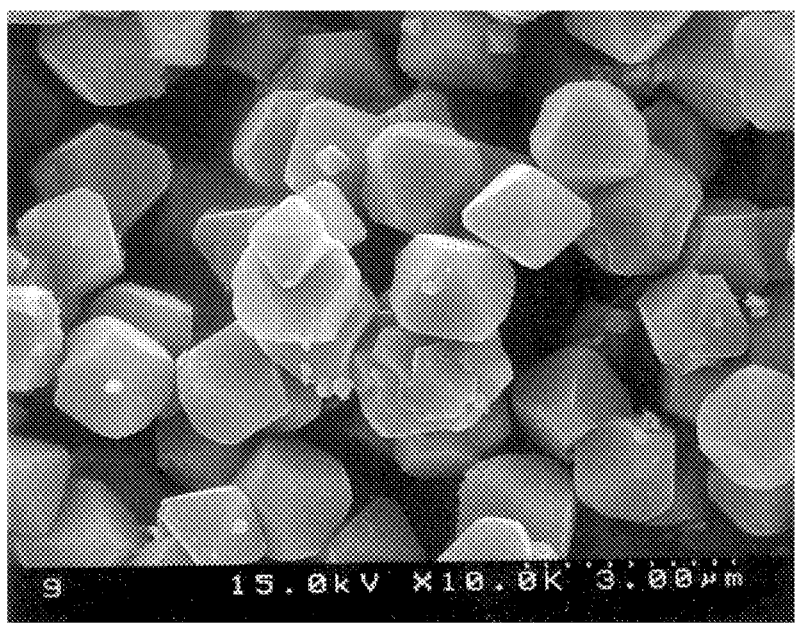
FIG. 11 is a configuration drawing representing the iron oxide particles produced according to example 6 of the present invention, which was observed by an electronic microscope.
Figure 11B:
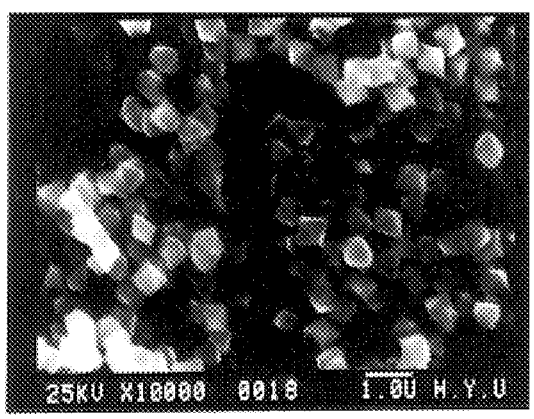
Figure 11C:
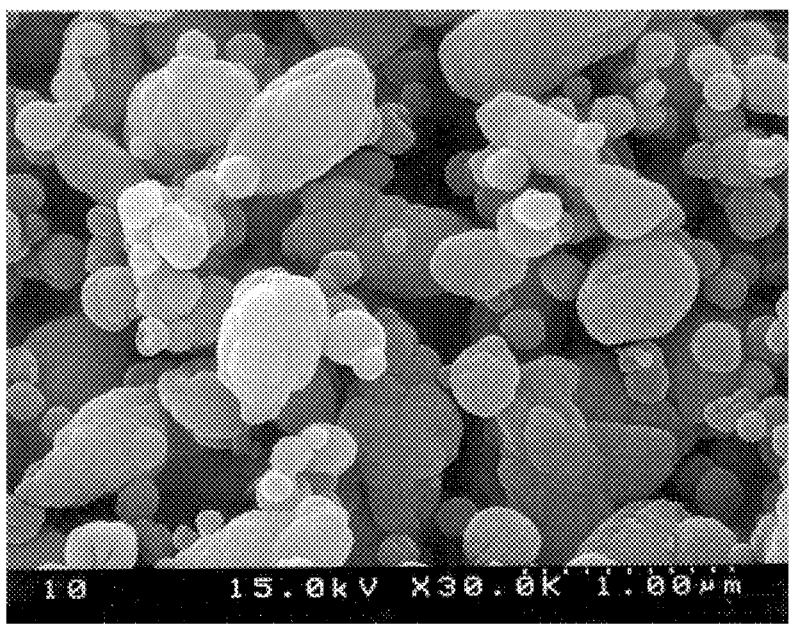
Figure 12:
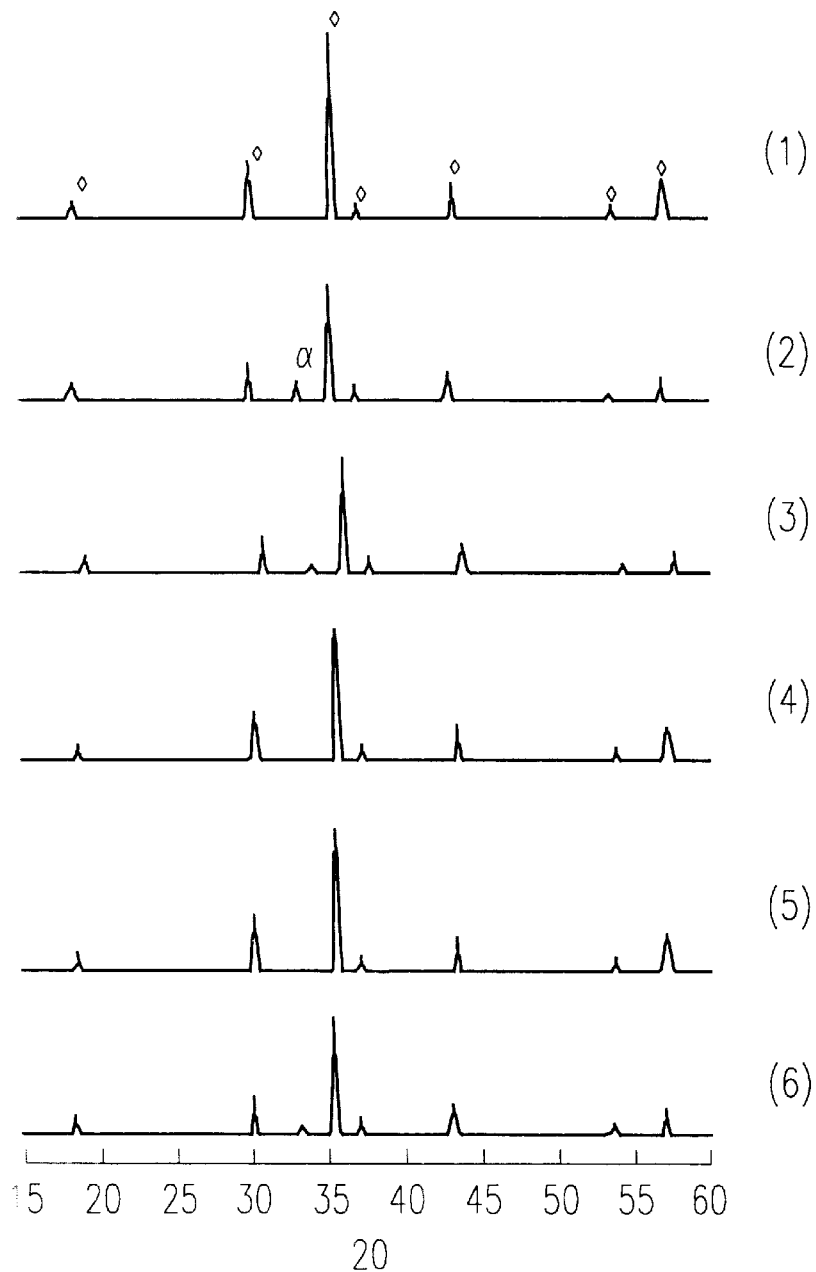
FIG. 12 is a drawing representing the result of X-ray diffraction analysis of iron oxide particles produced by examples according to the present invention.

1 g of α-FeOOH was dissolved in 60 ml of ethylene glycol, then 10 ml of water and each of $10^{-2}$, $10^{-1}$ and $5 \times 10^{-1}$ mol/l of $HNO_3$ aqueous solution were added to the mixture and thereafter the mixture was reacted in the reactor at a temperature of 230° C. for three hours to produce the powder. The forms of powder obtained are shown in FIG. 11 and the particle size of the powder obtained was between 0.1 and 1.2 µm. When the amount of $HNO_3$ added was $10^{-2}$ mol/l, the particle size and shape of the particles remained nearly unchanged. However, when $10^{-1}$ mol/l of $HNO_3$ was added, the particles grew into a complete octahedron form and the particle size decreased to almost 0.8 µm. Furthermore, when a $5 \times 10^{-1}$ mol/l of $HNO_3$ aqueous solution was added, small circular particles having no certain forms and size and having a particle size of almost 0.1 to 0.5 µm were produced. X-ray diffraction analysis on the crystallinity of the powder obtained showed that α-FeOOH was phase transferred into $Fe_3O_4$ (See FIG. 12).

Example 7

Figure 5:
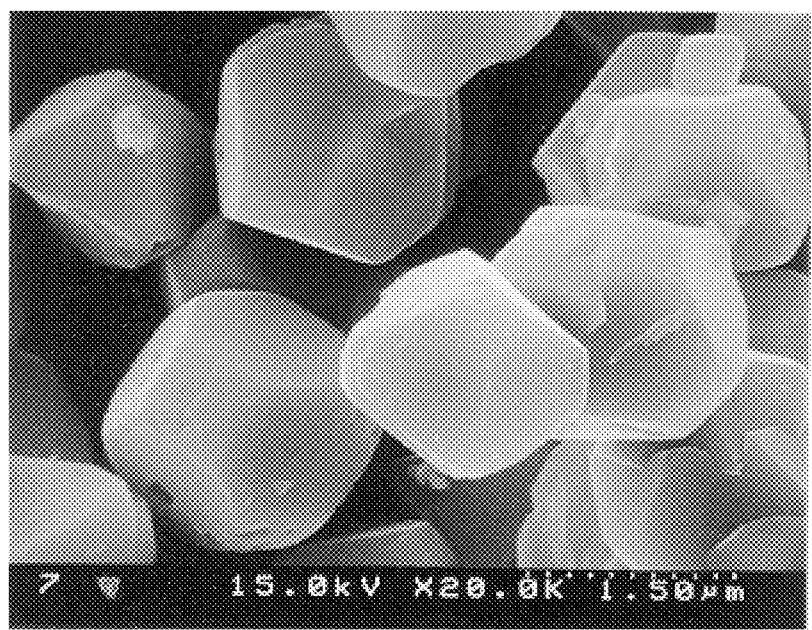
FIG. 5 is an enlarged view representing the detailed structure of iron oxide particles in a octahedron form produced according to example 7 of the present invention, which was observed by an electronic microscope.

1 g of α-FeOOH was dissolved in 60 ml of ethylene glycol, then 10 ml of water was added to the mixture, and thereafter the mixture was reacted in the reactor at the temperature of 230° C. for three hours. The powder thus obtained was tetradecahedron and the particles, having particle size, was 1.5 to 3.0 µm as shown in FIG. 5.

What is claimed is:

1. A method for producing iron oxide powder, of which the particle size and shape are controlled, comprising the steps of:

(i) dissolving α-FeOOH in propylene glycol as a solvent to provide a solution;

(ii) adding a controller for particle size and shape of the powder to the solution to provide a mixture; and (iii) reacting the mixture at a temperature of 150 to 300° C. for 1 to 48 hours.

2. The method of claim 1, wherein the concentration of said α-FeOOH is within the range of 0.1 to 0.5 mol/l.

3. The method of claim 1, wherein said controller for particle size and shape is at least one selected from the group consisting of water, itaconic acid and $HNO_3$.

4. The method of claim 1, wherein the iron oxide powder has a particle size in the range of 0.05 to 5.0 μm, and the iron oxide powder particles are in a form selected from the group consisting of round, octahedron, and tetradecahedron.

5. The method of claim 3, wherein said controller for particle size and shape is water, and is added in a concentration of 8 to 335 ml of water/liter of propylene glycol.

6. The method of claim 3, wherein said controller for particle size and shape is itaconic acid at a concentration of $10^{-3}$ to $5 \times 10^{-1}$ M.

7. The method of claim 3, wherein said controller for particle size and shape is $HNO_3$ at a concentration of $10^{-2}$ to $5 \times 10^{-1}$ M.

* * * * *